INVENTOR
DONALD H. RUGGLES
BY
ATTORNEYS

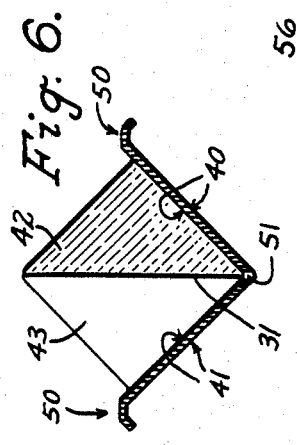

June 25, 1968 D. H. RUGGLES 3,389,513
STRUCTURAL PANELS AND STRUCTURES CONTAINING SUCH PANELS
Filed July 7, 1966 6 Sheets-Sheet 3
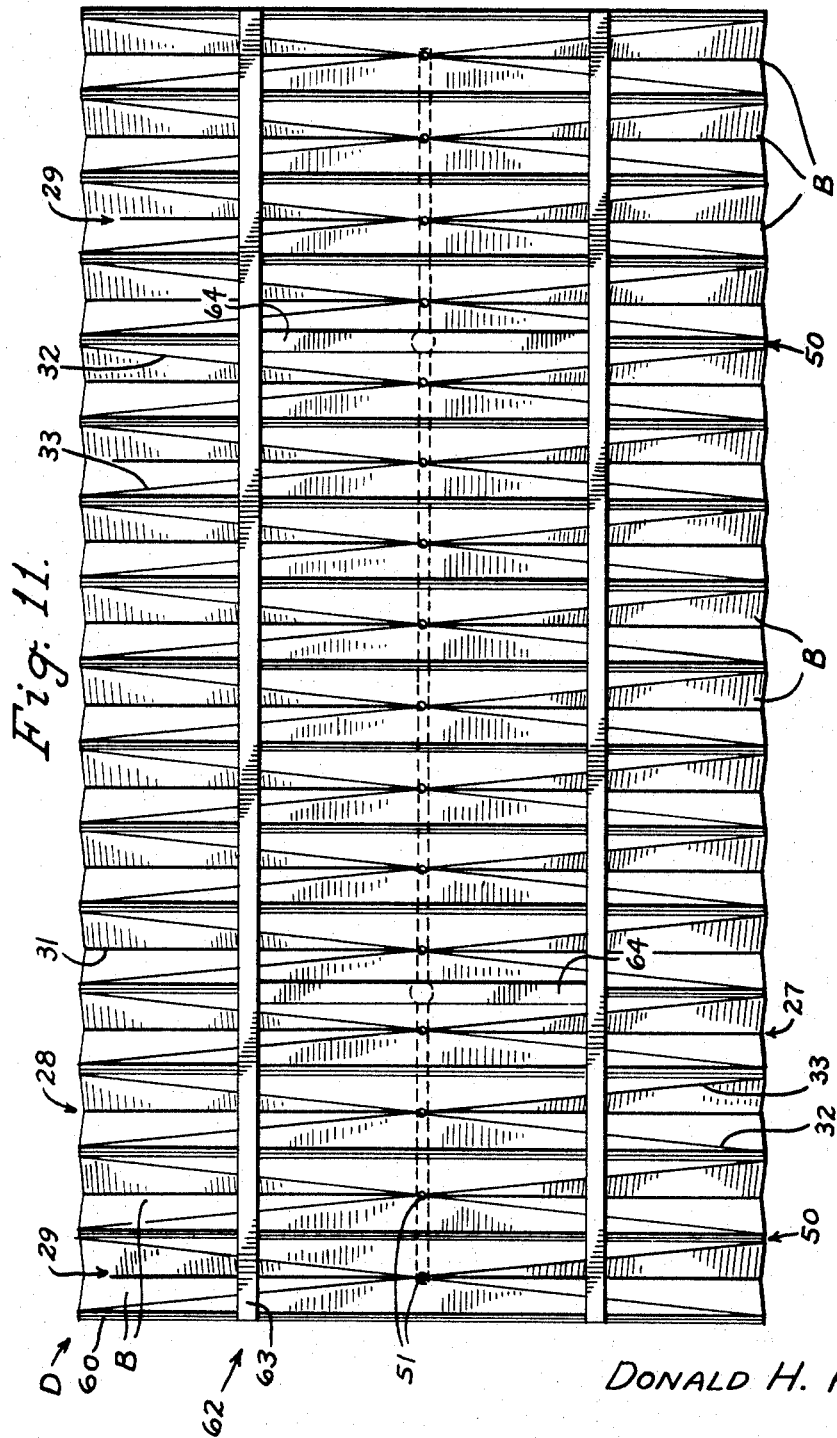
INVENTOR
DONALD H. RUGGLES
BY
ATTORNEYS

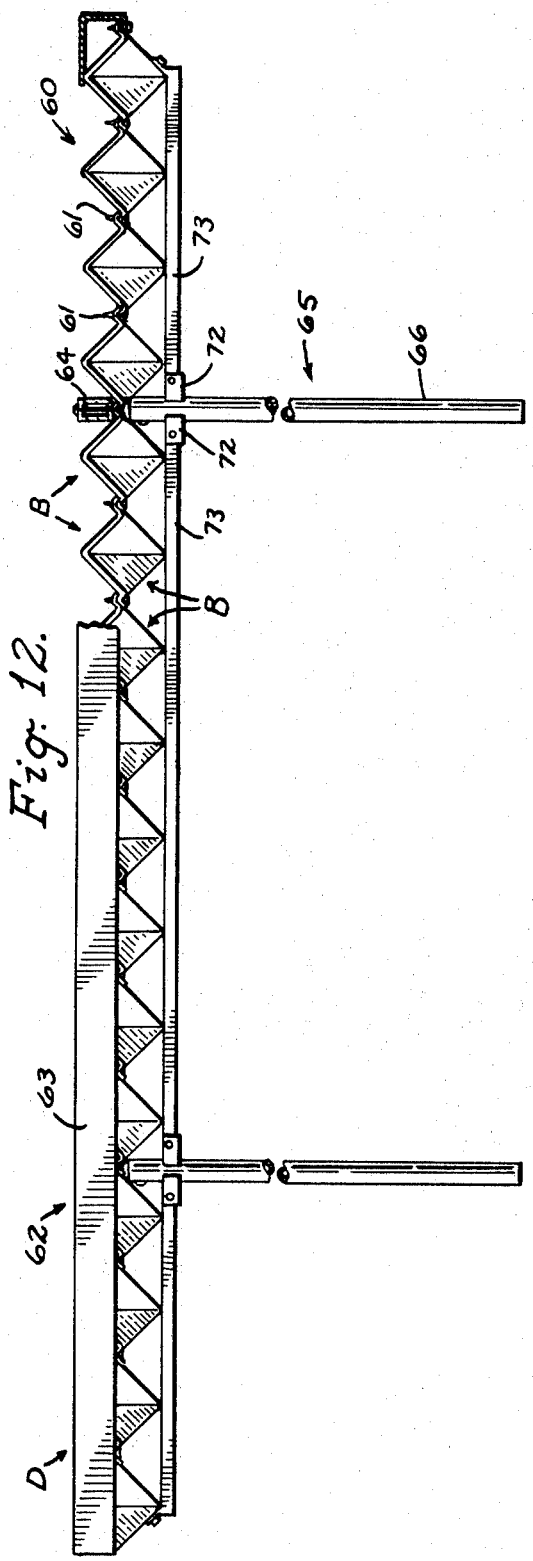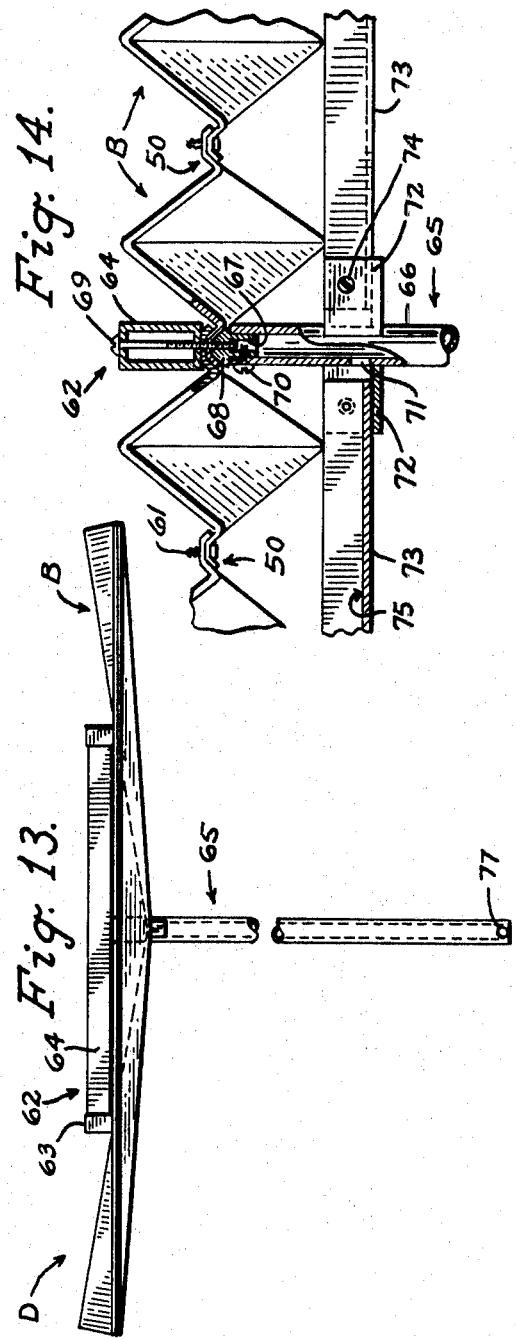

June 25, 1968     D. H. RUGGLES     3,389,513
STRUCTURAL PANELS AND STRUCTURES CONTAINING SUCH PANELS
Filed July 7, 1966     6 Sheets-Sheet 5
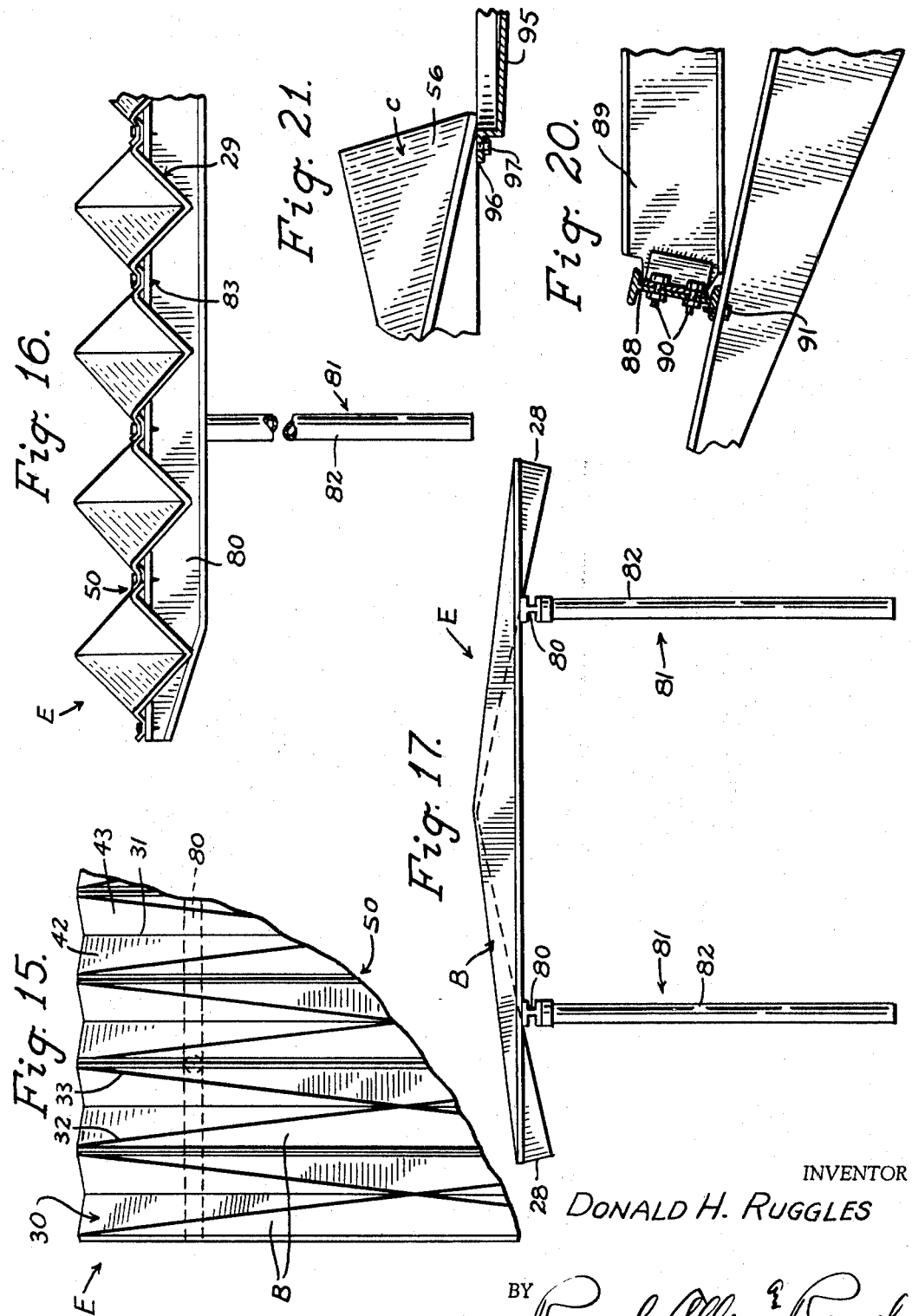
INVENTOR
DONALD H. RUGGLES
ATTORNEYS June 25, 1968   D. H. RUGGLES   3,389,513
STRUCTURAL PANELS AND STRUCTURES CONTAINING SUCH PANELS
Filed July 7, 1966   6 Sheets-Sheet 6
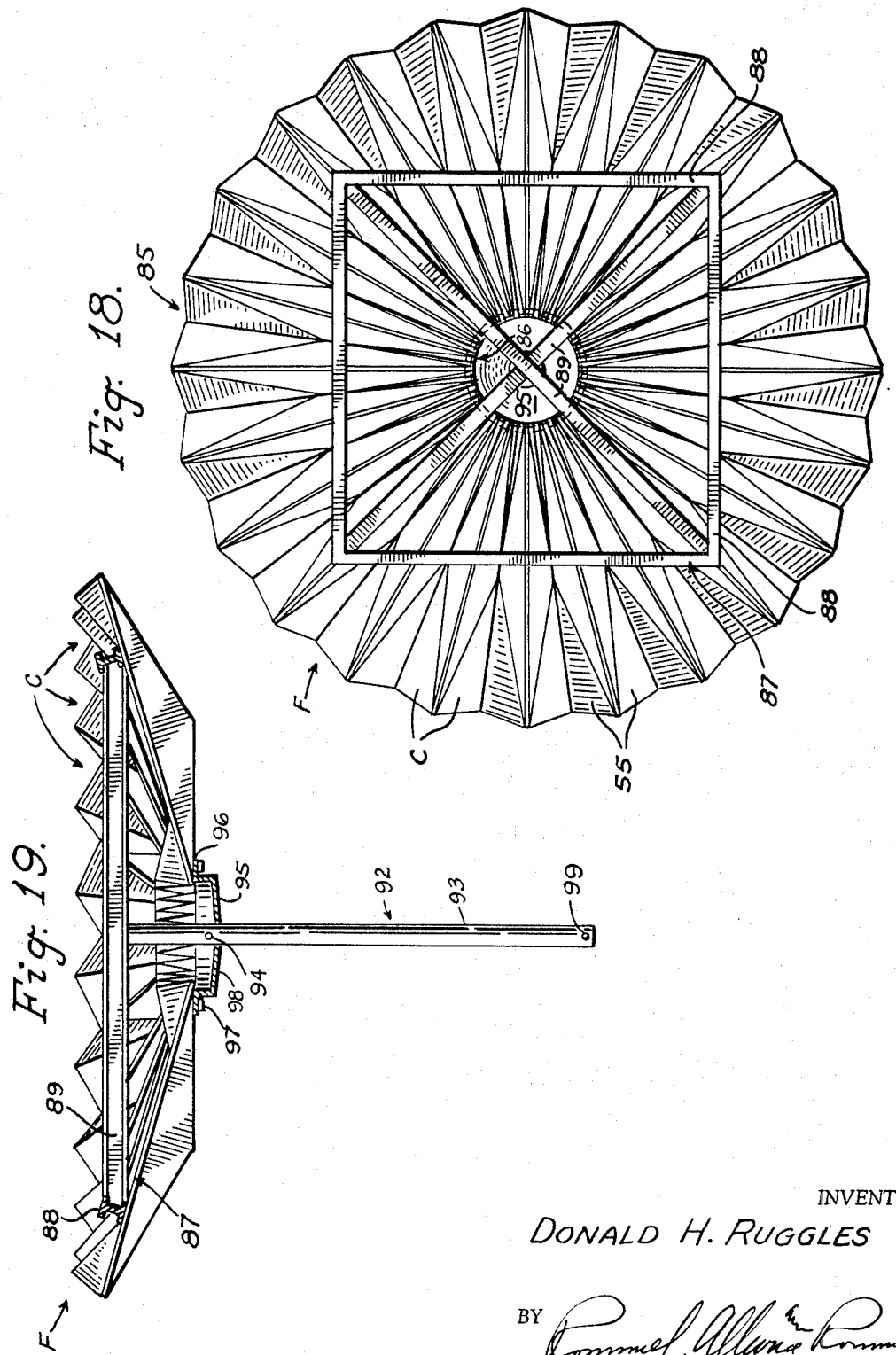
INVENTOR
DONALD H. RUGGLES
ATTORNEYS United States Patent Office 3,389,513
Patented June 25, 1968

3,389,513
STRUCTURAL PANELS AND STRUCTURES
CONTAINING SUCH PANELS
Donald H. Ruggles, 2819 S. Sheridan,
Tulsa, Okla. 74129
Filed July 7, 1966, Ser. No. 563,554
6 Claims. (Cl. 52—82)

ABSTRACT OF THE DISCLOSURE

Roofing panels provided from sheets of suitable material folded into watershed areas and dual-function flange areas which provide overlaps to the panels and cooperate with portions of the watershed areas to provide narrow gutters extending along side edge portions of the panels. The disclosure also includes building structures which include a plurality of the panels with their flanges overlapping and providing a plurality of such gutters to augment the number of areas which are adapted to shed water from the roofs of the building structures.

---

This invention relates to building constructions and more particularly to structural elements and structures containing such elements.

An important object of the invention is to provide structural panels which may be employed in the construction, for example, of canopies, which panels are each inexpensively fashioned from a sheet of suitable material to be connected to like panels and thus form a protection from the sun, rain and the like and also provide gutters for the effective collection and runoff of rain water and the like.

Another important object of the invention is to provide a building structure, such as a canopy, which provides protection from sun, rain and the like, and for the run-off of rain water and, while the structure is of generally light weight, will not be apt to be damaged by wind, hail and the like, nor collapsed by windstorms or snow collecting thereon.

Other objects and advantages of the invention will be apparent during the course of the following detailed description of the invention, taken in connection with the accompanying drawings, forming portions of this specification, and in which drawings:

FIG. 4 is an end elevational view thereof, but on a scale enlarged over those of FIGS. 2 and 3.

Figure 2:
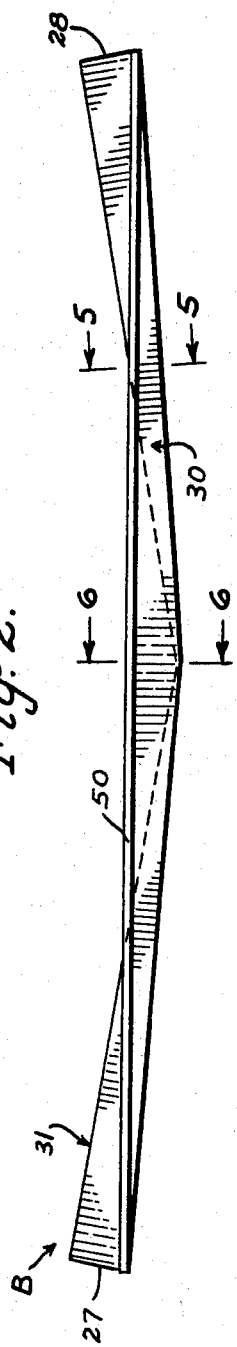
FIG. 2 is a side elevational view of one form of the panels of this invention.
Figure 3:
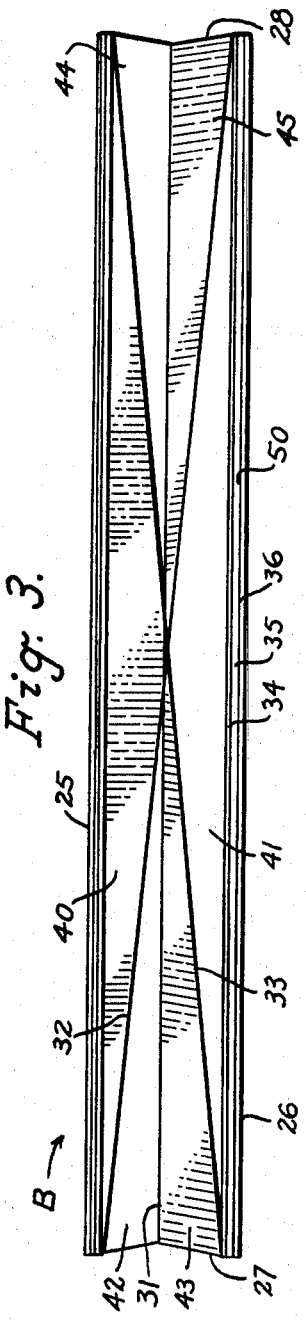
FIG. 3 is a top plan view thereof.

FIGS. 5 and 6 are vertical sectional views substantially on the lines 5—5 and 6—6 of FIG. 2, but on an enlarged scale.

FIG. 7 is a side elevational view, along the lines of FIG. 2, of another form of this invention.

FIG. 8 is a top plan view thereof.

FIG. 9 is an elevational view of one end of the panel of FIGS. 7 and 8, but on an enlarged scale.

FIG. 10 is an elevational view of the other end thereof, also on an enlarged scale.

FIG. 11 is a top plan view of a structure containing a plurality of the panels of FIGS. 1 to 6 inclusive, the panels being shown in plan of one face thereof.

FIG. 12 is a view, partly in end elevation and partly broken away in order to show additional structure.

FIG. 13 is an end elevational view of the structure of FIG. 12.

FIG. 14 is a fragmentary vertical sectional and end elevational view of a plurality of panels of the invention, on a scale enlarged over the foregoing view, and showing a method of forming the panels together.

FIG. 15 is a fragmentary top plan view of a structure, with the novel panels of FIGS. 2 to 6 inclusive employed inverted over their use as in FIG. 11.

FIG. 16 is a fragmentary side elevational view of the canopy of FIG. 15 and a support therefor, but on an enlarged scale.

FIG. 17 is an end elevational view of the canopy and supports therefor of FIGS. 15 and 16.

FIG. 18 is an elevational view of a circular canopy and support therefor employing the panel of FIGS. 8, 9 and 10.

FIG. 19 is a top plan view of the canopy of FIG. 18.

FIGS. 20 and 21 are fragmentary vertical sectional views of connection means for the panels of the canopy of FIGS. 17, 18 and 19, on an enlarged scale.

In the drawings, wherein for the purpose of illustration are shown various forms of the invention and wherein similar reference characters designate corresponding parts throughout the several views, the letter A designates the sheet of material from which the panels B and C are formed; and D, E and F are structures containing pluralities of the panels B or C.

The sheets A are preferably flat and rectangular and of aluminum, steel, iron, copper or alloys. The sheet A has opposite substantially parallel side edges 25 and 26, opposite substantially parallel end edges 27 and 28 joining the edges 25 and 26, and opposite faces 29 and 30. In the fashioning of either panel B or C, there will be provided a plurality of fold lines (indicated in FIG. 1 by dash lines), comprising the longitudinally-extending central fold line 31, longitudinally-extending cross fold lines 32 and 33, which extend from substantially the ends of the innermost flange-forming longitudinally-extending fold lines 34 and cross the fold line 31 at substantially the center of the sheet. Preferably, there are two other flange-forming fold lines 35 and 36 substantially paralleling the fold lines 34, spaced outwardly of the fold lines 34, inwardly of the side edges 25 and 26.

The panel B may be readily formed, as by being folded into shape from the blank A, with the face 29, for example, uppermost, by first folding the two half portions of the sheet downwardly along the fold line 31, folding the two half portions upwardly along the fold lines 32 and 33, then folding the marginal side portions upwardly along the innermost fold lines 34, then horizontally along the fold lines 35 and finally downwardly along the fold lines 36. The several foldings will then provide the areas 40 to 45 and the two flange areas 46 as in FIG. 1) and, of course, similar areas on the opposite side of the sheet, but whereas the axial center of the panel with the face 29 uppermost will be lowermost, when the panel is turned over with the face 30 uppermost, the axial center of the panel will be uppermost (as in FIGS. 16 and 17). As for the flange-forming fold lines, with the face 29 uppermost, the areas between the fold lines 34 and side edges 25 and 26 are folded downwardly, then horizontally on the fold line 35 and then upwardly on the fold line 36, thus providing the flanges 50. The areas 40 to 45 inclusive provide water shed areas, whether the face 29 or 30 is uppermost and the areas immediately adjacent the fold lines 32 and 33 provide gutters, all leading downwardly to the axial center of the panel, where the water may be drained off by an opening in the material of the panel. When the panel is turned over (as in FIG. 15), the areas immediately adjacent the fold line 31 become the major gutters and the areas 40 and 41 together with that portion of each of the flanges 50 between the fold lines 34 and 35 provide minor gutters. In this case, the drainage of the water will be over the end edges of the panels B, but no drainage over the side edges of any of the panels. In the form of the panel B, both end portions are substantially alike in width.

Figure 1:
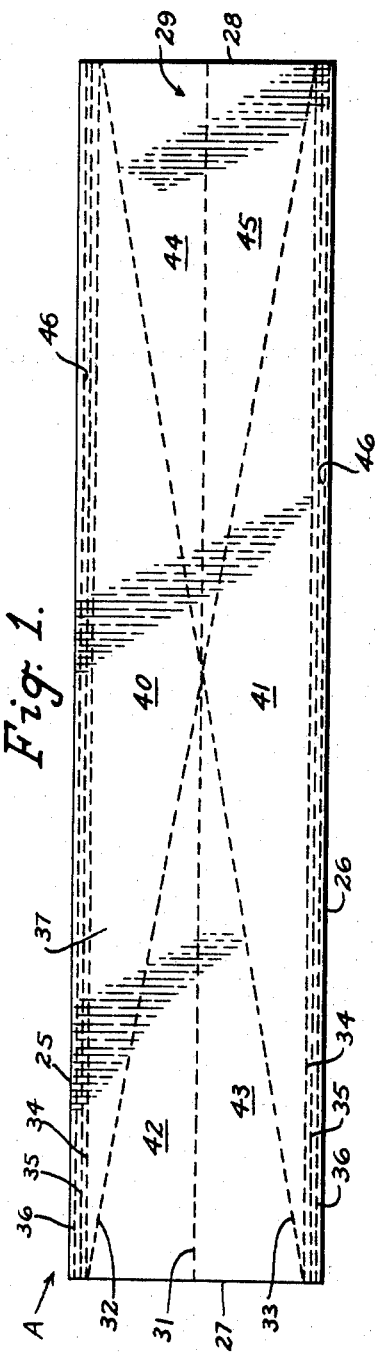
FIG. 1 is a plan view of a sheet of material from which the panels shown in FIGS. 2 to 10 may be formed.

The panels C are formed from a sheet which is exactly like the sheet A (but may be longer, shorter or/and wider or narrower, of course, since the dimensions of the sheet A need not follow those shown in FIG. 1). The difference between the panels B and C resides in the widening or narrowing of one end portion, as the portion 55, of the panels C, over their opposite end portions 56. However, in use, there are always two straight edge portions (the flanged edge portions) to each panel, which provide seats for bracing and support means to be subsequently described.

FIGS. 11, 12 and 13 relate to the structure D which includes a canopy or roof 60 composed of a plurality of side-by-side panels B, with their flanges 50 in overlapping relationship and the faces 29 of the sheets A, from which the panels are formed, uppermost. Any suitable means may be employed for securing the panels B together, at their overlapping flanges, such as the fasteners 61 threaded through suitable openings in the material of the flanges although bolt-and-nut assemblies, rivets or welding may be substituted without invention. However, in order to connect the canopy 60 to brace means 62 and to support means 65 different securing means may be employed in place of the fasteners 61.

Brace means 62 associated with the panels B of the canopy 60 may comprise a plurality of elongate longitudinally-extending beams 63, disposed upon the panels B, in contact with portions of the flanges 50, the beams 63 being rigidly connected, in any approved way, to cross beams 64. The beams 63 and 64 may be of steel, with the cross beams secured to the beams 63 as by welding. The cross beams also rest upon portions of the flanges 50. The beams 63 and 64 also provide weights to aid in preventing the canopy or portions thereof to become displaced, as by wind. Some of the fasteners 61, extending through the flanges, may also extend into the beams 63.

Support means 65 may comprise a plurality of upwardly-extending posts 66 which are preferably tubular metallic ones, such as of iron or steel. They have dual functions, since they also provide drainage means as will be described. The lower end portions of the posts 66 may be set in concrete, by way of example. Any preferred method may be employed, for connecting the upper ends of the tubular posts to the canopy 60. One method is shown in FIG. 14, where the open upper end portions of the posts 66 receive the depending flange 67 of a cap 68 which is screw-threaded to receive the shank of a screw 69 which may also extend through both the flanges 50 and across beam 64 with the head of the screw in contact with the upper surface of the cross beam. The flange may be detachably secured to the post as by a set screw 70 or the like. Spaced below the flange 67 are two or more spaced apart lateral openings 71 which communicate with two relatively short sleeves 72 welded or otherwise secured to the post and which receive the end portions of two upwardly open gutters 73, attached to the posts 66 as by screws 74. The horizontal planes of the openings 71 are slightly above the floors 75 of the gutters where the latter enter the sleeves 72. If desired, the floors 75 of the gutters may slope slightly toward the sleeves.

Each of the panels B, when intended for assembly to form a canopy for example like that of FIGS. 11, 12 and 13, requires an opening or port 51 to the gutters. The openings 51 are positioned at the lowermost portion (apex) of the panels B, directly over the open mouths of the gutters.

Rainwater flowing down the several watershed areas of the panels B will then flow along the gutters of the panels and discharge into the gutters 73 through the openings or ports 51. From the gutters 73, the water will then flow along the gutters 73 and sleeves 72 to and through the lateral openings 71 in the posts 66, descend through the posts and exit through the ports 77 at the lower end portions of the posts, either at or near the ground level or below ground level. The outer ends of the gutters 73 may be conventionally closed by substantially vertical walls as is common in the art.

FIGS. 15, 16 and 17 illustrate a structure E, which includes a canopy or roof containing a plurality of panels B, with the faces 30 of the panel A uppermost. Despite this positioning of the panels B, a plurality of watershed areas and gutters are provided although the discharge of the rainwater for example is over the ends of the panels (as may be appreciated from FIG. 17). Without the exercise of invention, conventional gutters may be provided at these ends to receive and carry off the water, or the water may simply fall to the ground. Brace means 80 consisting of elongated I-beams or beams similar to the beams 63 may be positioned under the panels B, and carried by support means 81 which may be a plurality of posts 82. FIG. 16 illustrates a method of securing the panels B at their flanges to the brace means 80, as by screw fasteners 83. The brace means 80 may be conventionally welded to the upper ends of the posts 82.

FIGS. 18 to 21 inclusive illustrate one use for the panels C of FIGS. 7 to 10 inclusive, to provide the structure F, with its non-rectangular canopy. The wider end portions 55 of the panels C occupy the outer and highest portions of the canopy 85 which is dish-like in that the narrower end portions 56 occupy the lowermost central portion of the canopy, defining a substantially circular opening 86, as in FIGS. 18 and 19. The panels C may be joined together at their flanges, as are the panels B, and are provided with brace means 87 preferably comprising a rectangular system of beams 88, welded or otherwise conventionally joined together at their ends, associated with cross beams 89, connected for example as in FIG. 20, by bolts 90 or the like, and the beams 88 connected to the flanges of the panels C as by screw fasteners 91 which may be like the fasteners employed in the structures D and E. The cross beams 89 cross each other at substantially the center of the canopy (FIG. 18), where support means 92 as an upright tubular post 93 is connected thereto at its upper end as by suitable connection means substantially like the structure 67 to 70 inclusive. The post 93 is provided with one or more lateral openings 94 to its interior to receive the water from a preferably circular gutter or open-mouthed pan 95 (FIGS. 19 and 21) which is carried by the flanges of the panels C at the outwardly extending flange 96 of the gutter 95 as by screws 97. Of course, the bottom 98 of the gutter 95 is below the horizontal plane or planes of the lateral opening or openings 94, and the post 93 may have a discharge port 99 adjacent its lower end for the discharge of the water flowing from the watershed areas and gutters of the panels C into the circular gutter 95 and the lateral opening or openings 94 of the post 93.

Each panel B or C is constructed of rigid waterproof sheet-like material and provided with six triangular-shaped waterhead areas on each face, a plurality of gutters, side flanges of which one area of each flange also providing one wall of a gutter when the panel is employed with the face 30 uppermost; the flanges also providing surfaces for the connection of bracing means for the panels when assembled into canopies or roofs of structures, such as the structures D, E and F. The two panels B and C may be formed from sheets of suitable material; a sheet providing either the panel B or the panel C, since the fold lines being alike for either panel and the only difference between the panel B and the panel C being in the widening or narrowing of one end portion of the panel B to provide the panel C.

The structures D, E and F have, in common, a plurality of side-by-side panels B or C, joined together at their side flanges and defining a plurality of watersheds and gutters communicating therewith, and with gravity flow of rainwater and the like to the lowermost portions of the assembled panels. Each structure has brace means which connects with the flanges of the associated panels, and each structure includes support means connected with the brace means rather than with the panels themselves.

Various changes may be made to the forms of invention herein shown and described without departing from the spirit of the invention or the scope of the claims.

What is claimed is:

1. A construction panel formed from a folded rectangular sheet of rigid waterproof material and provided with a plurality of interconnected parallel triangular-shaped watershed areas on both sides of said sheet, said areas being open at their outer ends, one watershed area on one side of said sheet being directly opposite another watershed area on said one side of said sheet, and each area forming a juncture with two adjacent watershed areas along a fold line of each and angularly disposed, one with the other two adjacent watershed areas, all the fold lines of each watershed area extending to and ending at the axial center of the panel, two similar watershed areas forming inclined side areas of the panel, and flanges extending outwardly directly from the outermost fold lines of the two similar inclined side areas, whereby said flanges and said inclined side areas of said panel provide longitudinally-extending gutters.

2. A building structure including a plurality of the panels of claim 1, substantially horizontally disposed; means joining the panels together at their flanges; brace means rigidly connected to each of the panels at the flanges; and support means for the panels and brace means, fixedly secured to the brace means.

3. A construction panel according to claim 1 characterized in that two of the fold lines of each area extend diagonally from inwardly of the corners of said panel and said outermost fold lines of the two similar inclined side areas join said two of the fold lines of each area inwardly of said corners.

4. A building structure including a plurality of the panels of claim 3, substantially horizontally disposed; means joining the panels together at their flanges; brace means rigidly connected to each of the panels at the flanges; and support means for the panels and brace means, fixedly secured to the brace means.

5. A construction panel according to claim 3 characterized in that one end portion of the panel is wider than the other end portion and each of the gutters is of the same width throughout its length.

6. A building structure including a plurality of the panels of claim 5, substantially horizontally disposed; means joining the panels together at their flanges; brace means rigidly connected to each of the panels at the flanges; and support means for the panels and brace means, fixedly secured to the brace means.

References Cited

UNITED STATES PATENTS

| 2,082,116 | 6/1937 | Mopin | 52—82 |
| 2,191,383 | 2/1940 | Haswell | 52—630 |
| 3,143,194 | 8/1964 | Hart | 52—18 XR |
| 3,151,947 | 10/1964 | Hastings | 52—630 XR |
| 3,277,616 | 10/1966 | Koss | 52—82 XR |
| 3,299,585 | 1/1967 | Wilkins | 52—13 |

FRANK L. ABBOTT, *Primary Examiner.*

P. C. FAW, *Assistant Examiner.*